Patented Feb. 17, 1925.

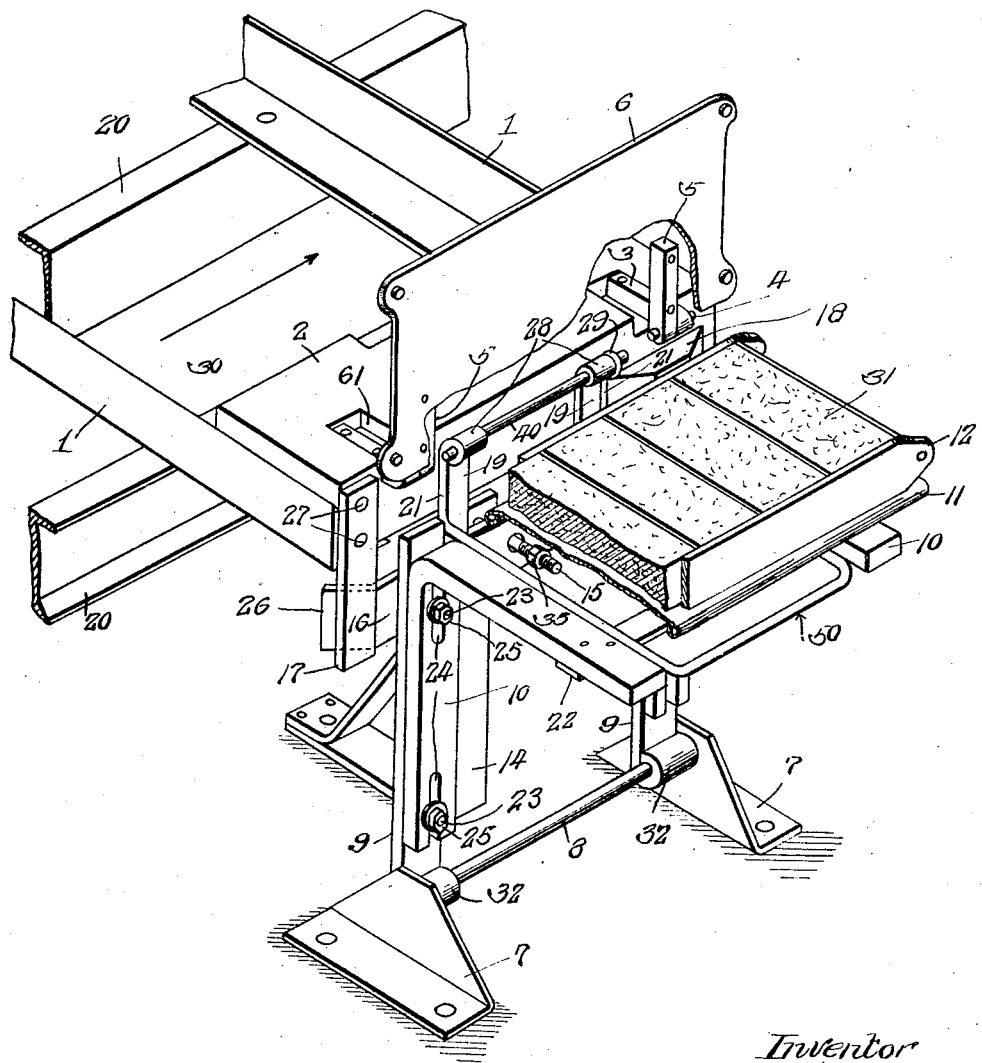

1,527,123

UNITED STATES PATENT OFFICE.

ROY P. M. DAVIS, OF MOUNT UNION, PENNSYLVANIA.

DUMP TABLE.

Application filed July 20, 1922. Serial No. 576,300.

*To all whom it may concern:*

Be it known that Roy P. M. Davis, a citizen of the United States of America, residing at Mount Union, in the county of Huntingdon and State of Pennsylvania, has invented certain new and useful Improvements in Dump Tables, of which the following is a specification.

My invention relates to dump tables for brick making machines.

Heretofore in certain types of brick making machines it has been necessary to deposit the mold and bricks therein in inverted position upon a table mounted on the mold carriage, after the carriage has moved the mold beneath the mud discharging hopper and thence beneath the slickers. This necessitates the removal of the mold by off bearers to another table (where bricks are stripped from the mold) before another movement of the carriage is permissible. This arrangement not only requires considerable floor space but consumes much time and requires steps on the part of the off-bearer.

The object of my invention is to obviate the foregoing objections and permit of an earlier movement of the mold carriage than heretofore. This and other objects I accomplish by hinging the bottom plate of the mold upon the mold block or base which moves with the mold carriage, and by hinging a mold saddle upon a table mounted adjacent the frame upon which the carriage runs, means being provided to prevent interference between the hinges during the movement of the carriage and to insure proper registering of the two sets of hinges as regards their centers, so that the filled mold with its pallet and bottom plate, as well as the saddle may be swung about a common center and in consequence the relative relation of these parts will remain undisturbed or fixed.

In the accompanying drawing forming part of this specification,

The figure is a perspective fragmentary view partly in section of a brick making machine carriage frame showing the application of my invention.

Referring more particularly to the drawings 20 represents a pair of longitudinally disposed channel-beams, and 1 represents a pair of transversely disposed L beams resting upon and bolted to the former. These beams 20 and 1 constitute a carriage 30 suspended from and adapted to move to and fro in the direction of the arrow upon the brick making machine frame in a manner not shown herein but described in my co-pending application Serial No. 576,298 filed July 20, 1922, which has become Patent No. 1,498,614.

Resting upon the projecting ends of the transverse L beams 1 is a mold block 2 recessed in its top face as at 61 for the reception of hinge lugs 3. Similar lugs 5 are hinged to the projecting ends of the lugs 3 by means of hinge pins 4, the purpose of the lugs 5 being to hingedly support the bottom plate 6 upon which the mold hereinafter referred to rests. It may here be noted that when the bottom plate 6 is swung down to horizontal position upon the mold block, the hinge lugs 5 will seat in the recesses 61 beside the lugs 3 and flush with the top of the mold block 2. Also that the mold block 2 and hinged bottom plate 6 move with the carriage 30.

Mounted on the floor adjacent the frame of the machine (not shown) is a table 50 comprising spaced supports 7 between which extends a horizontally disposed fixed shaft 8, to which are pivoted as at 32 a pair of uprights 9. Angle brackets 10 are secured to the uprights 9 by means of bolts 23 which project outwardly through the uprights and thence through vertically disposed slots 24 formed in the vertical arm of the brackets 10, nuts 25 on the ends of the bolts 23 providing means for adjusting the angle brackets 10 vertically with respect to the uprights 9. These brackets 10 form a support for the pallet 11 and mold 12 when the latter have been swung into the position illustrated in the drawings as will be again referred to hereinafter, while a cross bar 22 connecting the brackets 10 supports the free end of a saddle 21, the construction and operation of which will presently be explained.

The hinged uprights 9 support a horizontally disposed bar 16 having its free end offset or bent inwardly towards the path of a lug or arm 17 depending from the mold block 2, to which it is secured by suitable fasteners 27. Attached to the bar 16 are uprights 19 formed with enlargements 28 in which is mounted a hinged pin 40, upon the projecting ends of which pin 40 the ends of the saddle 21 are secured for pivotal movement.

The saddle 21 is of substantially U-shape having offset ends, formed with eyes 29, through which the hinge pin 40 extends.

The inward and outward stroke of the table is limited by means of an adjusting screw 15 carried by a stop bracket 14 mounted on the floor, nuts 35 on the screw being adapted to contact with the bar 16 for this purpose.

From the foregoing it is thought that the operation will be clearly understood but the same may be briefly described as follows:

Normally the table will assume by gravity a position away from the path of movement of the carriage and mold block to permit the latter to clear the uprights 19 and saddle 21. As the carriage approaches the end of its stroke lug 17 engages the offset end 26 of bar 16 and thereby causes the uprights 9 as well as the bar 16 and uprights 19 to rock inwardly the shaft 8 serving as a pivot during this movement for the table and parts carried thereby. Of course the saddle 21 will move bodily in a corresponding direction. The axis of hinge pin 40 will now coincide with the axis of hinge pins 4, and the table will be locked against outward movement by lug 17, and against inward movement by uprights 19 contacting with the mold block 2. The saddle is now swung (by the offbearer) over on top of the pallet 11 which covers the mold 12 resting upon the bottom plate, the latter as previously explained being hinged to the mold block. The bottom plate 6, mold 12 and brick 31 therein, together with the pallet 11 and saddle 21 are now swung in a reverse direction until saddle and pallet rest upon the cross bar 22 and angle brackets 10 respectively.

The offbearer now swings the bottom plate back to its original or horizontal position with respect to the mold block 2, and places a fresh mold thereon, whereupon the carriage will be ready for a return trip, while the offbearer proceeds to strip the brick from the mold and place them on a car or other conveyor (not shown) by simply making a half turn.

When the carriage begins its return movement, lug 17 will ride clear of the offset end of bar 16 and the table will rock outwardly on its pivot thereby permitting the carriage and mold block to clear the uprights 19 and saddle 21. However, should the table fail to move outwardly by gravity, cam 18 secured to mold block 2 by any suitable means (not shown) will engage uprights 19 and produce the desired movement.

Having thus described my invention what I claim is:

1. In a brick making machine having a movable carriage, a mold block supported on said carriage, adapted to receive a mold thereon, a support adjacent the path of travel of said carriage, a table pivoted to said support adapted to receive the brick mold and brick contained therein, and means actuated by the carriage for rocking said table on its pivot towards said carriage at the completion of the stroke of said carriage.

2. In a brick making machine having a movable carriage, a mold block supported on said carriage adapted to receive a mold thereon, a bottom plate for the mold hinged to said mold block, a table support, a mold table hinged to said support adjacent the path of travel of said carriage, a saddle hinged to said table, and means for rocking said table on its pivot towards said carriage to bring the axis of saddle pivot into alinement with the axis of the bottom plate.

3. In a brick making machine having a movable carriage, means on said carriage for supporting a brick mold, a pivoted mold table mounted adjacent the path of travel of said carriage, and means on said table actuated by means on said carriage for rocking said table towards said carriage to bring said table into position to receive the mold at the completion of the stroke of the carriage.

4. In a brick making machine having a movable carriage, a mold block supported on said carriage adapted to receive a mold thereon, said mold block formed with recesses therein, hinged lugs in said recesses flush therewith and projecting therefrom, a second pair of lugs adapted to also seat in said recesses flush therewith when folded inwardly, a back plate for the mold fixed to said second pair of lugs and foldable therewith to lie flush with the top of said block, a pivoted table adjacent the path of travel of said carriage, uprights on said table, a saddle pivotally mounted on said uprights, and means for rocking said table on its pivot to bring said uprights between said lugs with the axis of the saddle pivots in line with the axis of the back plate pivots.

5. In a brick making machine having a movable carriage, a mold block on said carriage for supporting a brick mold, a pivotally mounted mold table adjacent the path of movement of said carriage, a saddle pivotally mounted on said table, means for moving said table and saddle towards said carriage and mold block at the completion of the stroke of said carriage, said table adapted to move by gravity away from said carriage when the carriage starts on its return trip.

6. A brick making machine having a movable carriage, a mold block on said carriage for supporting a brick mold, a mold receiving table mounted adjacent the path of travel of said carriage and mold block and normally maintained by force of gravity away from said path, and means for moving said table towards the path of travel of said carriage and mold block to facilitate transfer of the brick mold from said mold block to said table.

7. A brick making machine having a movable carriage, means on said carriage for supporting a brick mold, a bottom plate for the mold hinged to said mold supporting means, pivotally mounted spaced uprights adjacent the path of movement of said carriage and mold support, a table pivotally supported by said uprights, means for adjusting the table vertically with respect to said uprights, a lug on said carriage and an offset bar on said table adapted to be engaged by said lug to rock said table towards the path of movement of said carriage and mold support at the completion of the stroke of said carriage.

8. In a brick making machine having a movable carriage, a mold block on said carriage for supporting a brick mold, a pivotally mounted mold table adjacent the path of movement of said carriage, a saddle pivotally mounted on said table, means for moving said table and saddle towards said carriage and mold block at the completion of the stroke of said carriage, and positive means for moving said table away from said carriage when the carriage starts on its return trip.

9. In a brick making machine having a frame constituting mold supporting means, a brick receiving table mounted adjacent the frame for pivotal movement towards and away from the mold supporting means and a saddle pivoted to said table.

In testimony whereof I affix my signature in presence of two witnesses.

ROY P. M. DAVIS.

Witnesses:
  T. L. ARCHEY,
  O. L. HALLETT.